(12) United States Patent
Kirchner et al.

(10) Patent No.: US 8,550,214 B2
(45) Date of Patent: Oct. 8, 2013

(54) MACHINE HAVING LUBRICANT CIRCUIT

(75) Inventors: Eckhard Kirchner, Ginsheim (DE); Jo Vermeulen, Kellyville NSW (AU); Richard Tamba, Castle Hill (AU)

(73) Assignee: GM Global Technology Operations LLC, Detroit, MI (US)

( * ) Notice: Subject to any disclaimer, the term of this patent is extended or adjusted under 35 U.S.C. 154(b) by 13 days.

(21) Appl. No.: 13/015,038

(22) Filed: Jan. 27, 2011

(65) Prior Publication Data

US 2011/0180352 A1 Jul. 28, 2011

(30) Foreign Application Priority Data

Jan. 27, 2010 (DE) .......................... 10 2010 005 749

(51) Int. Cl.
*F16H 57/04* (2010.01)
(52) U.S. Cl.
USPC .......................................................... 184/6.12
(58) Field of Classification Search
USPC ........... 184/6.12, 6.28, 6.11, 11.1, 11.2, 11.3, 184/43, 53
See application file for complete search history.

(56) References Cited

U.S. PATENT DOCUMENTS

| | | | |
|---|---|---|---|
| 4,644,815 A * | 2/1987 | Kawano et al. ................. | 74/467 |
| 5,064,025 A * | 11/1991 | Richards ....................... | 184/6.12 |
| 5,989,150 A * | 11/1999 | Yamamoto ........................ | 476/8 |
| 6,110,070 A * | 8/2000 | Nagai et al. ....................... | 476/8 |
| 6,296,445 B1 | 10/2001 | Chasseguet et al. | |
| 7,523,686 B2 * | 4/2009 | Hwang et al. ............... | 74/606 R |
| 2001/0011616 A1 * | 8/2001 | Kageyama et al. .......... | 184/6.12 |
| 2005/0014598 A1 | 1/2005 | Ishikawa et al. | |
| 2005/0172740 A1 | 8/2005 | Ebihara et al. | |
| 2006/0180014 A1 | 8/2006 | Yoshida et al. | |

FOREIGN PATENT DOCUMENTS

| | | |
|---|---|---|
| DE | 3320086 A1 | 12/1984 |
| DE | 19747695 A1 | 5/1998 |
| DE | 19980674 T1 | 8/2000 |
| DE | 102006001659 A1 | 8/2006 |
| DE | 102008011937 A1 | 9/2009 |
| EP | 1914403 A1 | 4/2008 |
| JP | 60104869 A | 6/1985 |
| JP | 10002403 A | 1/1998 |

OTHER PUBLICATIONS

German Patent Office, German Search Report for Application No. 10 2010 005 749.5 dated Nov. 10, 2010.

* cited by examiner

*Primary Examiner* — William E Dondero
*Assistant Examiner* — Mark K Buse
(74) *Attorney, Agent, or Firm* — Ingrassia Fisher & Lorenz, P.C.

(57) ABSTRACT

A machine includes, but is not limited to at least one first shaft, which is mounted so it is rotatable in a housing, a lubricant duct extending in the first shaft along its axis, and at least one lubrication point, which is supplied with lubricant via a supply line comprising the lubricant duct. A section of the supply line runs in a first wall of the housing between an outlet opening of the lubricant duct and the lubrication point.

18 Claims, 3 Drawing Sheets

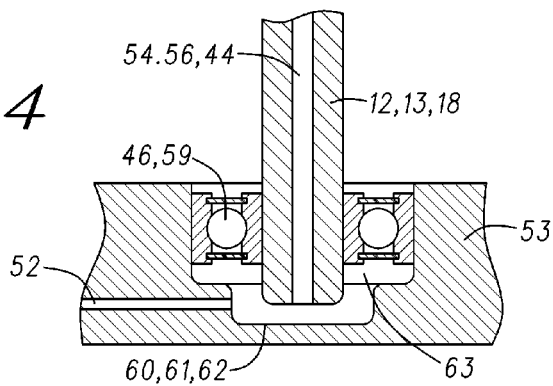
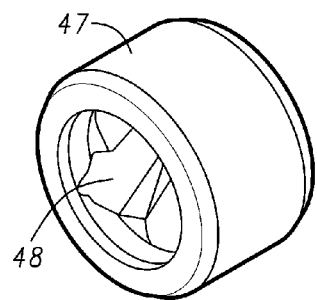
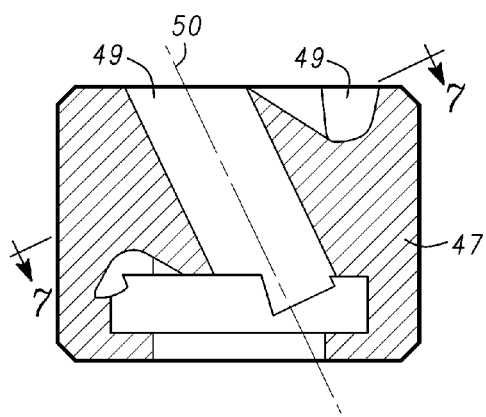
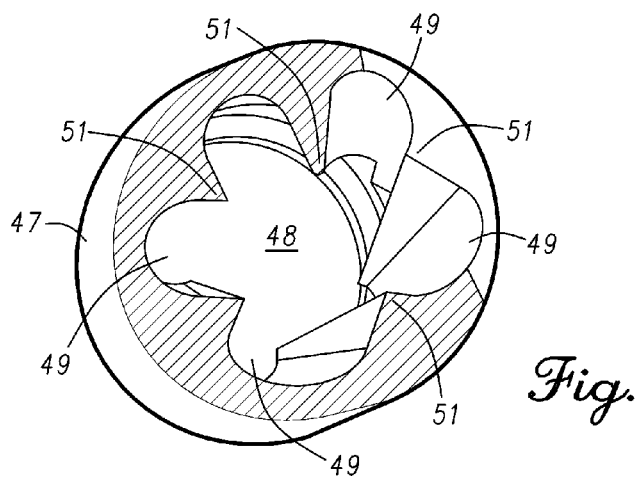

MACHINE HAVING LUBRICANT CIRCUIT

CROSS-REFERENCE TO RELATED APPLICATION

This application claims priority to German Patent Application No. 102010005749.5, filed Jan. 27, 2010, which is incorporated herein by reference in its entirety.

TECHNICAL FIELD

The technical field relates to the lubrication of a machine, in particular a shift transmission for a motor vehicle.

BACKGROUND

Diverse technologies are typical for lubricating surfaces of moving parts of such a machine which are endangered by friction wear. In order to lubricate gearwheels which mesh with one another, it is sufficient if one of these gearwheels immerses at least a part of its circumference in a lubricating oil reservoir. Lubricating oil entrained upon immersion is distributed over the entire circumference of the immersed wheel and also the circumference of a wheel meshing therewith. Oil which is spun off of these wheels forms a mist in the interior of the machine, which is deposited on other gearwheels and thus ensures their lubrication. Surfaces of bearings moving against one another are generally not suitable for such immersion or spray mist lubrication because of their protected placement. In order to lubricate such a bearing, providing a shaft extending through the bearing with a lubricant duct, which extends along the shaft and from which spur holes extend to the bearing, in order to flush through the bearing using lubricating oil, is known from DE 33 20 086 C2, for example. An outlet opening is formed on one end of the shaft, via which the oil returns into the reservoir.

If a machine according to this prior art has still further lubrication points that are not situated around the shaft, these must be supplied with lubricant independently of the lubrication points of the shaft, or branching lines must lead from a common lubricant source to the lubricant duct of the shaft and the other lubrication points. Both solutions result in a significant space requirement for the lubricant circuit, and the necessity of providing supply lines for the lubrication points makes placing the remaining components of the machine more difficult.

In view of the foregoing, at least on object is to specify a machine that allows even poorly accessible lubrication points to be supplied with lubricant via a compact system of supply lines, which causes little obstruction of the placement of other machine components. In addition, other objects, desirable features and characteristics will become apparent from the subsequent summary and detailed description, and the appended claims, taken in conjunction with the accompanying drawings and this background.

SUMMARY

The at least one object is achieved in that, in a machine having at least one first shaft mounted so it is rotatable in a housing, a lubricant duct extending in the first shaft along its axis, and at least one lubrication point, which is supplied with lubricant via a supply line comprising the lubricant duct, a section of the supply line runs in the wall of the housing between an outlet opening of the lubricant duct and the lubrication point. This allows a supply of the lubrication point via a short supply line even if it can be reached poorly or not at all using a supply line fixed in place on the housing. The lubricant duct preferably extends between opposing front ends of the first shaft, i.e., the outlet opening of the lubricant duct on a first front end is opposite to an intake opening on the opposing front end.

If the shaft is sufficiently linear, the hole can also be linear, so that the lubricant can flow through with little resistance even in the case of a small cross-section. This allows more efficient lubricant supply than a line which must follow a possibly complex three-dimensional contour of a wall.

The lubrication point which is supplied via the lubricant duct and the supply line section adjoining thereon can particularly be a bearing of a second shaft. If the lubrication point is situated in the first wall, solely the line section running in the first wall is sufficient to supply it with lubricant. If the lubrication point is located in a second wall of the housing, the lubricant circuit expediently additionally also comprises a lubricant duct extending in the second shaft at least up to the lubrication point.

Since the second wall is not required to guide sections of the supply line therein, it can be contoured strongly three-dimensionally. In particular, the second wall can have a projection facing toward the first wall, which is hollow on an outer side facing away from the first wall, in order to house other parts of a motor vehicle drivetrain, in particular a clutch, therein. Above all a double clutch has a high space requirement, so that the hollow projection is particularly useful for a space-saving housing of the double clutch.

The bearing, which is supplied with lubricant via the supply line, preferably engages in a recess of the first or second wall and delimits a lubricant chamber together with this wall. This allows a direct supply of the bearing with lubricant through contact with the lubricant chamber, without a spur line being required in the second shaft.

The lubricant duct can be fed via a drop catcher situated on an end of the first shaft, which is used to catch lubricant sprayed in the machine, in particular lubricant atomized upon immersion of a splashing part of the machine in a reservoir. Furthermore, it is preferable for the lubricant duct to comprise at least one section on the shaft, which is parallel to the rotational axis of the shaft, having ribs which extend warped to the rotational axis and protrudes radially inward. These ribs promote the movement of the lubricant in the supply line. Such a lubricant duct can be implemented simply, in that said section parallel to the shaft is formed by a hollow body inserted into the lubricant duct.

A preferred area of application is a stepped transmission for motor vehicles.

BRIEF DESCRIPTION OF THE DRAWINGS

The embodiments will hereinafter be described in conjunction with the following drawing figures, wherein like numerals denote like elements, and:

FIG. 4 shows a section through a recess of the housing wall and a shaft mounted therein;

FIG. 5 shows a perspective view of a turbine for conveying lubricant oil;

FIG. 6 shows a section through the turbine in a plane shifted parallel to the axis of the turbine; and FIG. 7 shows a section through the turbine along plane VII-VII from FIG. 6.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
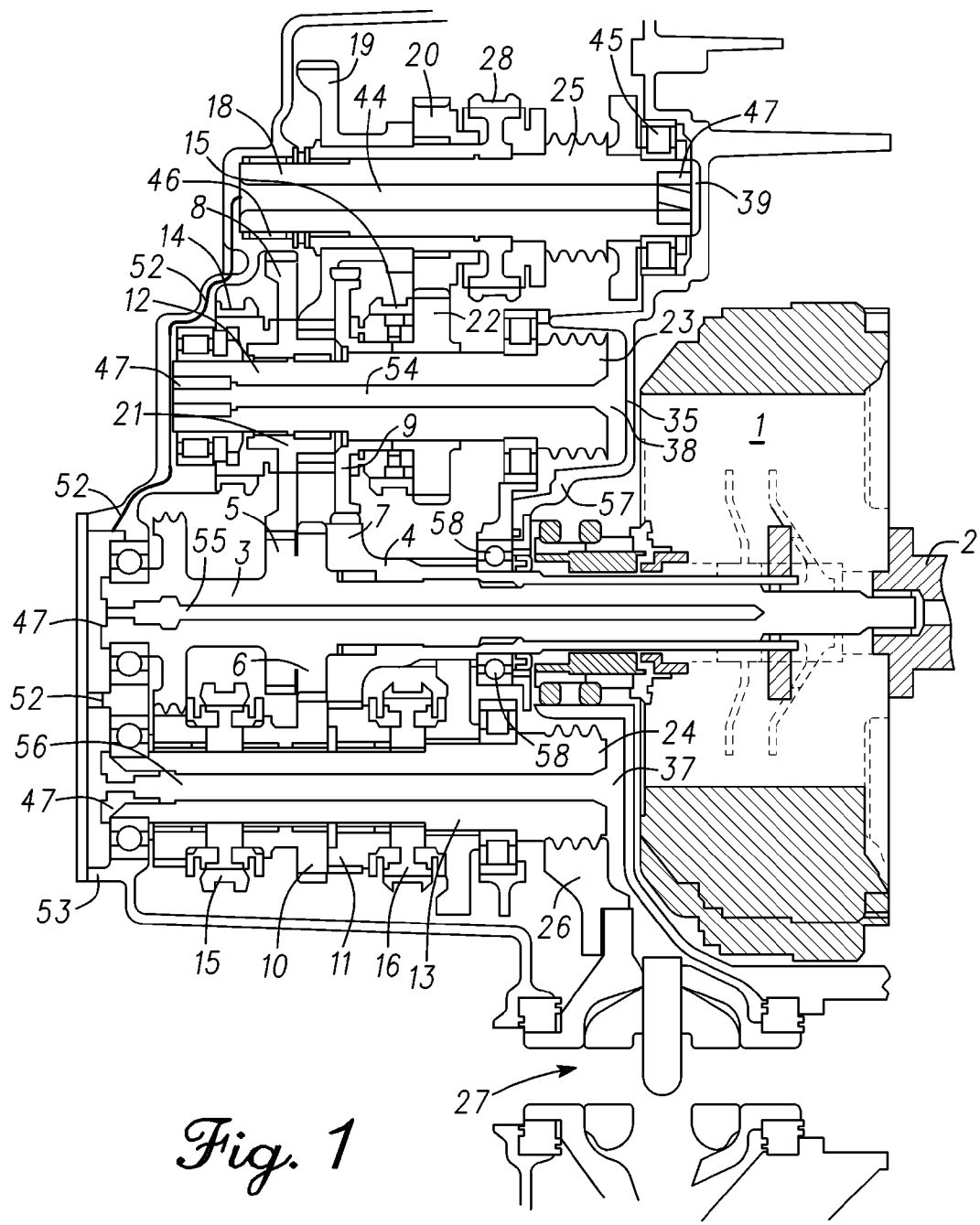
FIG. 1 shows a double-clutch transmission in an axial section.

FIG. 1 shows a schematic section through a double-clutch transmission for a motor vehicle. A double clutch 1, which is known per se, is situated between the output shaft 2 of an engine, which is not shown, and two input shafts 3, 4, which are situated concentrically to one another on the same axis, of the transmission, in order to alternately apply torque to the input shaft 3 or the input shaft 4.

Multiple gearwheels 5, 6, 7 are installed rotationally fixed on the input shafts 3, 4, which in turn mesh with gearwheels 8 to 11 on two parallel lay shafts 12, 13. The gearwheels 8 to 11 of the lay shafts 12, 13 are fixable in a rotationally fixed manner on the lay shafts 12, 13 via locking synchronization devices 14 to 17. A third lay shaft 18 carries gearwheels 19, 20, which mesh with gearwheels 21, 22 of the lay shaft 12. In that, for example, the locking synchronization device 15 couples the gearwheel 22 to the lay shaft 12, a first gear of the transmission can be implemented by torque transmission between the gearwheels 5, 8, 21, 19, 20, 22.

In order to allow shifting between the gears without torque interruption, the second gear, like all even-numbered gears, is assigned to the hollow input shaft 4, while the odd-numbered gears are produced via the inner input shaft 3, which extends through the hollow input shaft 4. Since the principles of such double-clutch transmissions have been previously published in various forms, they do not need to be explained in detail here.

Every lay shaft 12, 13, 18 carries a pinion 23, 24, 25, which meshes with a ring gear 26 of a differential 27. In that a locking synchronization device 28 locks the gearwheels 19, 20 on the lay shaft 18, a reverse gear can be generated via its pinion 25. The shafts 3, 4, 12, 13, 18 are received in a housing 29, on whose floor an oil sump 30 is located. The housing has walls 35, 53 oriented transversely to the shafts. The walls 35, 53 each have multiple cup-like or shell-like recesses 37, 38, 39 or 60, 61, 62, respectively, in which roller bearings 45, 58 or 46, 59, which bear the shafts 13, 12, 18, are inserted.

Figure 2:
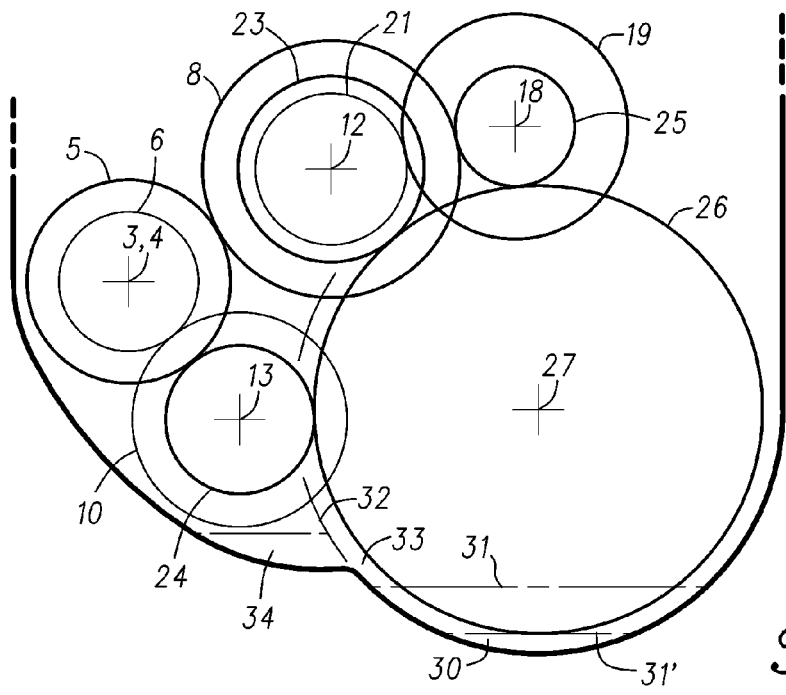
FIG. 2 shows the double-clutch transmission in a schematic cross-section.

FIG. 2 illustrates the location of the axes of the differential 27, the input shafts 3, 4, and the lay shafts 12, 13, 18 in a housing 29, which encloses the transmission. Some of the gearwheels of the transmission are shown as circles concentric to the axes in FIG. 2

The ring gear 26 of the differential 27 extends furthest down of all gearwheels and is immersed on a part of its circumference in the oil sump 30. In order to keep splashing losses small, the oil level 31, which is indicated as a dot-dash line, is set when the transmission is stationary so that the gearwheels of the shafts 3, 4, 12, 13, 18 are not immersed and their teeth which mesh with one another are lubricated by oil mist swirled up by the ring gear 26. When the transmission is running, the oil from the sump 30 is distributed everywhere in the housing 29. Oil which runs off of the shafts 3, 4, 12, 13 and their gearwheels first reaches a temporary store 34, which lies somewhat higher than the oil sump 30 in the housing 29 and is separated from the oil sump 30 by an inner wall 32. A narrow gap 33 at the lower end of the inner wall 32 allows a delayed backflow of the oil into the sump 30. This has the result that in operation, the oil level of the sump 30 drops to a level 31', which is still sufficient to wet the teeth of the ring gear 26. The splashing losses of the transmission in continuous operation are thus close to zero.

Figure 3:
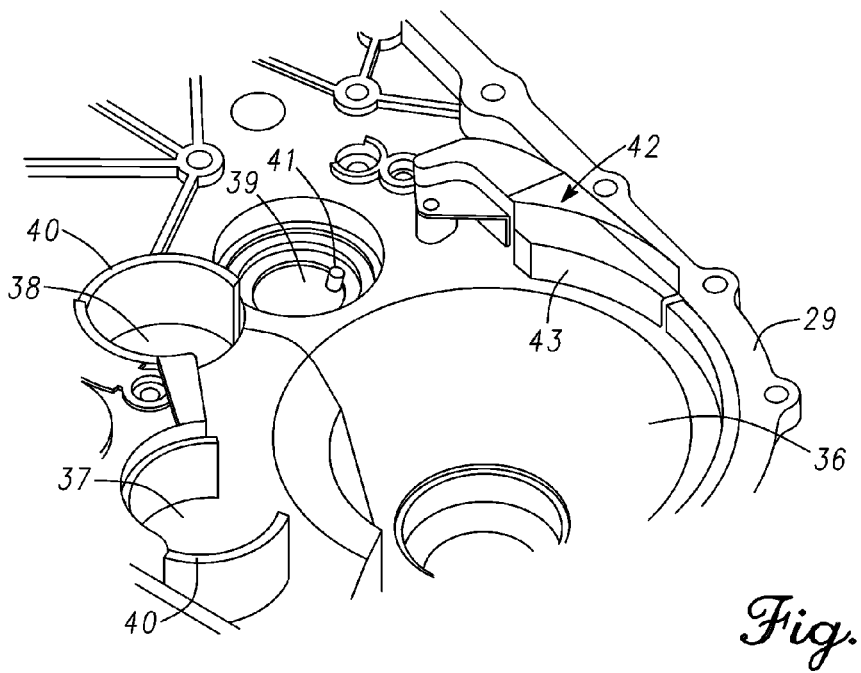
FIG. 3 shows a detail view of a housing wall of the transmission having a drop catcher fastened on the housing wall.

FIG. 3 shows a perspective detail view of an inner side of the wall 35 of the housing 29 enclosing the transmission. A roomy recess 36, which is provided to accommodate a part of the differential 27, fills up a majority of the lower area of the wall 35. The recesses 37, 38, 39 are shown all around the recess 36, which each accommodate an end section of the lay shafts 13, 12, or 18, respectively, and the roller bearings 45 or 58 bearing this end section. While the recesses 37, 38 are essentially delimited by ribs 40 protruding from the wall 35, the recess 39 is indented in the wall 35, and the end of a hole 41 can be seen on its floor, which extends within the wall 35 to a drop catcher 42. The drop catcher 42 has a cross-section curved like a horn having an open end 43, which faces toward the ring gear 26 (not shown in FIG. 3) to catch oil, which the teeth of the ring gear 26 entrains from the oil sump 30 during its rotation and subsequently spins off. The collected oil reaches the recess 39 via the drop catcher 42 and the hole 41. The recess 39, a front end of the lay shaft 18 engaging therein, and a flank of the roller bearing 45 delimit a chamber containing oil here. The roller bearing 45 is lubricated with the oil of the chamber by contact.

As shown in FIG. 1, a duct 44 extends over the entire length of the lay shaft 18 up to the recess 62, corresponding to the recess 39, which, together with the front end of the lay shaft 18 engaging therein and the roller bearing 46, delimits a chamber, from which the roller bearing 46 acquires lubricant oil. A line 52 originating from this chamber extends in the wall 53 to the other recesses 61, 62 of the wall 53. The line 52 can be applied in a star shape, or it can connect the recesses 60, 61, 62 to one another in a row. The recesses 61, 62 in turn delimit, together with the roller bearings 59 inserted therein and the front ends of the shafts 12 or 13, respectively, oil chambers, via which the bearings 59 are supplied with oil.

FIG. 4 shows the above-described state of affairs in a uniform illustration for the shafts 12, 13, 18. The chamber, which is delimited by the recess 60, 61, or 62, the shaft 12, 13, or 18, and the roller bearing 46 or 59, is identified by 63. In the case of the recess 62, oil flows from the duct 44 of the shaft 18 through the chamber into the line 52; in the case of the recesses 60, 61, the oil passes from the line 52 via the chamber 63 into ducts 54 or 56 of the shaft 12 or 13, respectively.

The ducts 54, 56 open into oil chambers in the recesses 38 or 37, respectively, which in turn adjoin the bearings 58 and supply them with oil. In order to convey the oil throughput through the duct 44, a turbine 47 is inserted into a widened area on the end of the lay shaft 18 facing toward the receptacle 39. FIG. 4, FIG. 5, and FIG. 6 show this turbine 47 in a perspective view or in section.

The turbine 47 is, as shown in FIG. 5, a one-piece metal body essentially having the form of a flat cylinder, through which a passage 48 extends in the axial direction. The passage 48 is obtained by multiple drilling or milling steps. Multiple holes 49, five here, are advanced at uniform angular intervals to one another warped to the axis of symmetry through the body of the turbine 47; i.e., each rotation of the turbine 47 by $2\pi/5$ around its axis of symmetry transfers the turbine 47 into itself. The diameter of the holes 49 is selected so that they fuse into a single passage 48. FIG. 6 shows a section through the turbine 47 along an axis—identified by 50 here—of such a hole 49, a second hole 49 may be seen in the section.

FIG. 7 shows the turbine in section along the plane VII-VII, which is perpendicular to the hole axis 50, from FIG. 6. In this section, walls 51, which remain between the individual holes 49 and protrude radially inward into the passage 48, may be seen, which give oil penetrated therein an impulse in the axial direction when the turbine 47 rotates. As also shown in the section of FIG. 6, the holes 49 approach closer and closer to the outer circumference of the turbine on the downstream side of the turbine 47. Therefore, not only the warped orientation of the holes 49 and walls 51, but rather also the centrifugal force acting in the rotating turbine 47 drive the oil through the turbine 47. A dynamic pressure can thus be built up downstream from the turbine 47 in the duct 44, which ensures a sufficient oil supply of the roller bearings 45, 46, 58, 59.

To increase the oil pressure in the ducts 54, 55, 56, the shafts 3, 12, 13 can also be provided with turbines 47 on the input side, i.e., on their end facing away from the double clutch 1.

It is also conceivable to only provide the shafts 3, 12, 13 located downstream with turbines 47, in order to ensure a lubrication of the roller bearings, which is qualitatively equivalent to the lubrication of the roller bearings 45, 46.

The embodiments have been described above especially with reference to a transmission having double clutch, since such transmissions represent a preferred area of application. The increased space requirement of the double clutch 1 in comparison to a typical single clutch results in strong contouring of the wall 35, having a projection 57 protruding far into the transmission housing 29 around the input shafts, which makes the oil supply of the roller bearings 58, which bear the shafts 3, 4, 12, 13 on the side of the wall 35, via lines guided in the wall 35 difficult. However, it is obvious that the invention is also usable in other constructions of transmissions or in general for the oil supply of any desired lubrication points in diverse types of machines. Thus, for example, supplying lubrication points via a lubricant duct which extends along a camshaft in an internal combustion engine comes into consideration.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A machine, comprising:
a housing;
a first shaft rotatably mounted in the housing;
a lubricant duct extending in the first shaft along a axis;
a supply line; and
a lubrication point supplied with a lubricant via the supply line comprising the lubricant duct,
wherein a section of the supply line is adapted to run in a first wall of the housing between an outlet opening of the lubricant duct and the lubrication point.

2. The machine according to claim 1, wherein the lubricant duct extends between opposing ends of the first shaft.

3. The machine according to claim 2, wherein the outlet opening of the lubricant duct on a first end of the first shaft is opposite to an intake opening on an opposing end of the first shaft.

4. The machine according to claim 1, wherein the lubricant duct is adapted to run linearly in the first shaft.

5. The machine according to claim 1, wherein the lubrication point is a bearing of a second shaft.

6. The machine according to claim 5, wherein the lubrication point is situated in a second wall of the housing opposite to the first wall.

7. The machine according to claim 6, wherein a lubricant circuit comprises the lubricant duct extending in the second shaft at least up to the bearing.

8. The machine according to claim 6, wherein the second wall comprises a projection facing toward the second wall, wherein the projection is hollow on an outer side thereof facing away from the first wall.

9. The machine according to claim 8, wherein a clutch is attached in the recess of the second wall.

10. The machine according to claim 9, wherein the clutch is a double clutch.

11. The machine according to claim 5, wherein the bearing engages in a recess of the first wall and delimits a lubricant chamber together with the first wall.

12. The machine according to claim 1, wherein the lubrication point is situated in the first wall.

13. The machine according to claim 1, wherein the lubricant duct is fed via a drop catcher situated on the first shaft.

14. The machine according to claim 13, wherein the drop catcher is situated on an end of the first shaft facing away from the first wall.

15. The machine according to claim 13, wherein a parallel section is formed by a hollow body inserted into the lubricant duct.

16. The machine according to claim 1, wherein the lubricant duct comprises a second section of one of a plurality of shafts parallel to a rotational axis of the first shaft comprising ribs extending warped to the rotational axis and protruding radially inward.

17. The machine according to claim 1, wherein the machine is a stepped transmission.

18. The machine according to claim 1, wherein the section of the supply line adapted to run in the first wall is separate from the lubricant duct.

* * * * *